United States Patent [19]

Anderson et al.

[11] Patent Number: 5,861,918
[45] Date of Patent: Jan. 19, 1999

[54] METHOD AND SYSTEM FOR MANAGING A REMOVABLE MEMORY IN A DIGITAL CAMERA

[75] Inventors: Eric C. Anderson, San Jose; Mike Masukawa, Los Gatos, both of Calif.

[73] Assignee: FlashPoint Technology, Inc., San Jose, Calif.

[21] Appl. No.: 780,396

[22] Filed: Jan. 8, 1997

[51] Int. Cl.[6] .................................................. H04N 5/76
[52] U.S. Cl. ........................................ 348/233; 348/231
[58] Field of Search ..................................... 348/231, 232, 348/233, 333; 345/348–351, 353–354, 357; 386/38, 45, 117, 118, 121, 125, 126

[56] References Cited

U.S. PATENT DOCUMENTS

| | | | |
|---|---|---|---|
| 5,138,459 | 8/1992 | Roberts et al. ......................... | 348/233 |
| 5,633,678 | 5/1997 | Parulski et al. ......................... | 348/232 |
| 5,648,816 | 7/1997 | Wakui ..................................... | 348/233 |
| 5,706,457 | 1/1998 | Dwyer et al. ........................... | 395/349 |

*Primary Examiner*—Wendy Garber
*Assistant Examiner*—Aung S. Moe
*Attorney, Agent, or Firm*—Stephen G. Sullivan

[57] ABSTRACT

A method and system for managing a removable memory used in a digital camera. The method and system includes creating a camera folder on the removable memory corresponding to the digital camera when the removable memory is first inserted into the digital camera. When images are captured, the images are stored only in the folder, such that the removable memory can be used with more than one digital camera without image name conflicts.

13 Claims, 7 Drawing Sheets

METHOD AND SYSTEM FOR MANAGING A REMOVABLE MEMORY IN A DIGITAL CAMERA

FIELD OF THE INVENTION

The present invention relates generally to digital cameras, and more particularly to a method and system for managing a removable memory used in a digital camera.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. Efficient operation of the computer is therefore an important consideration for camera designers and manufacturers. The memory architecture of a particular computer system determines data storage techniques and can thus significantly effect the operational efficiency of the entire digital camera system.

The user interface in conventional digital cameras typically includes a view finder in which small versions of the captured images may be displayed to allow a user to review several images at once. By selecting one of the images, the user may then display the full-sized version of the images in the view finder.

The images captured by the digital camera are typically named by numbering the images starting with an initial number, such as the number one, and ending with a maximum number. The images displayed in the view finder may then be identified by their assigned numbers. Once the maximum number of images has been named, the user must delete the images or download the images to a host computer in order to clear the camera's memory. Thereafter, the camera begins naming new images starting with the number one again.

This conventional method for naming images results in several naming conflicts that may result in some images being overwritten and lost. One type of naming conflict occurs in cameras that are equipped with some type of removable storage medium for storing images. For instance, assume that the removable memory, such as a flash disk, includes a series of old images that are named from one to the maximum number as described above. If the user begins capturing images, the camera will begin naming the new images starting with the number one since the maximum number has been reached. This results in the old images stored on the removable memory being overwritten by the new images that have the same names.

Another type of naming conflict occurs when conventional cameras are connected to a host computer for transferring images. Assuming that both the host computer and the camera include stored images, then both the host computer and the camera may have a set of images with the same names. If any attempt is made to the download images from the host computer to the camera, then the images with the conflicting names in the camera may be overwritten. Similarly, if any attempt is made to upload images from the camera to the host computer, then the images in the host computer with the conflicting names may be overwritten.

A method for minimizing the naming conflicts that occur in a digital camera is disclosed in co-pending U.S. patent application Ser. No. 08/761,854 entitled "A System And Method For Naming Images In A Digital Camera Device."

In this method, the digital camera maintains a count of the total number of captured images stored in the camera, and then incorporates this number in the name assigned to each image. Although this creates unique image names for the images captured by a particular camera because the nonrepeating count total, naming conflicts may still arise when a single removable memory device is used to store images from a number of different cameras, because each camera will eventually generate the same images names.

Accordingly, what is needed is a method and system for managing the removable memory in a digital camera, such that image name conflicts are avoided. The present invention addresses such a need.

SUMMARY OF THE INVENTION

The present invention provides a method and system for managing a removable memory used in a digital camera. The method and system includes creating a camera folder on the removable memory corresponding to the digital camera when the removable memory is first inserted into the digital camera. When images are captured by the digital camera, the images are stored only in that folder. In a preferred embodiment of the present invention, the folder is made unique by generating a name for the folder from the serial number assigned to the digital camera.

According to the system and method disclosed herein, the present invention enables a single removable memory to store images taken by different digital cameras, such that image name conflicts are avoided. In addition, the present invention automatically categorizes images according to the digital camera that captured the images since the folder names indicate the originating camera by serial number.

DESCRIPTION OF THE INVENTION

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention is a digital camera that includes a method and system for managing a removable memory used in the digital camera.

Figure 1:
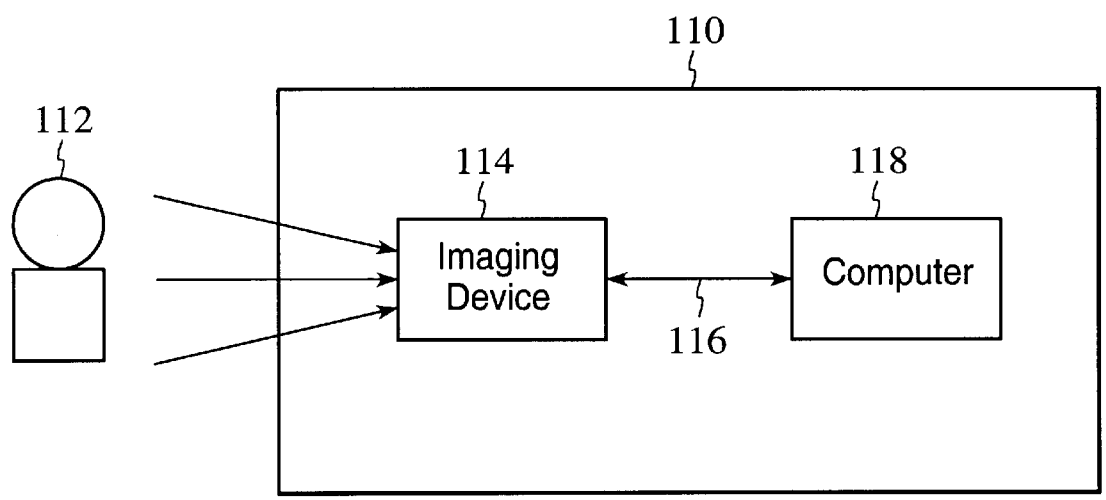
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
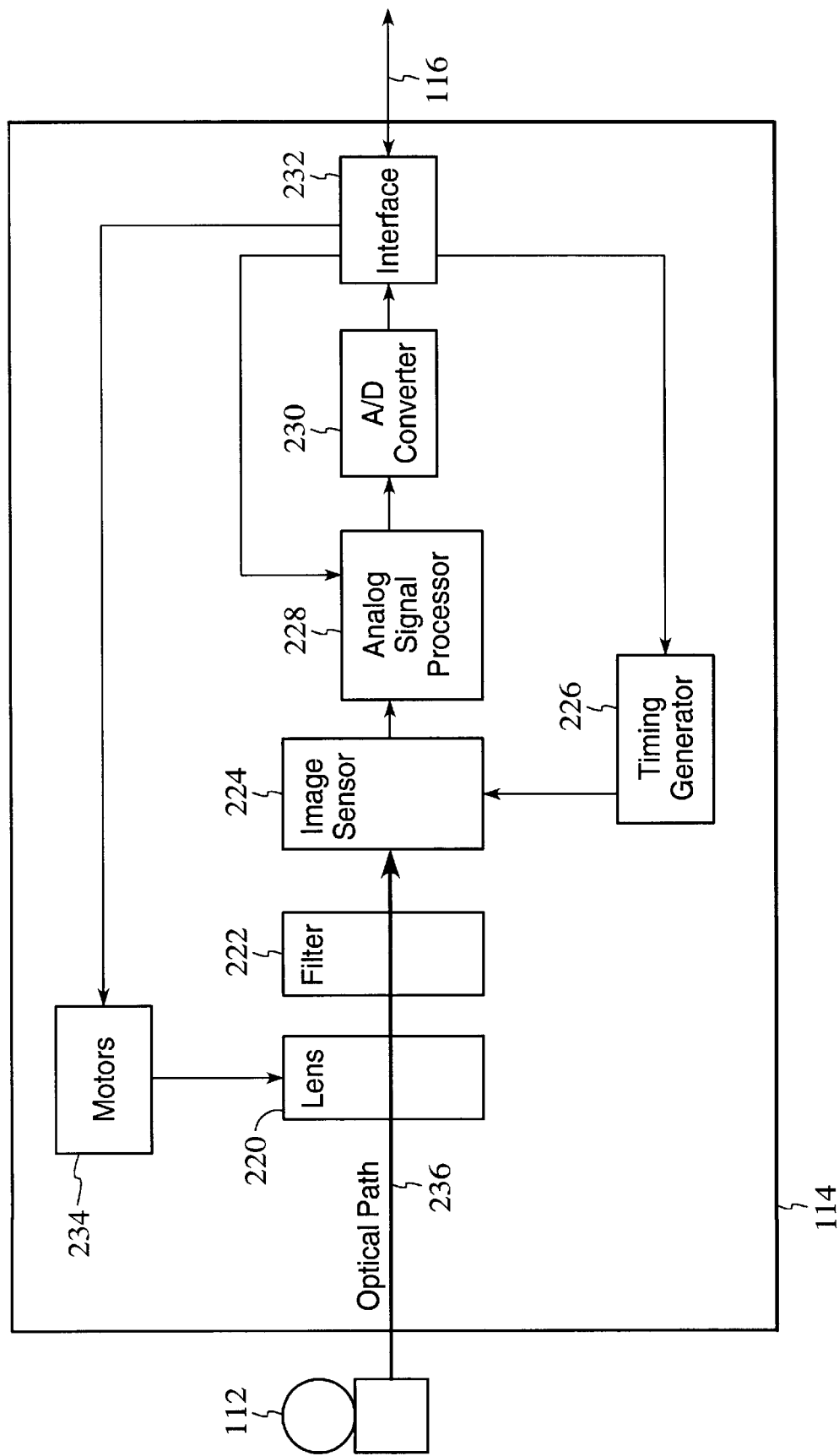
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
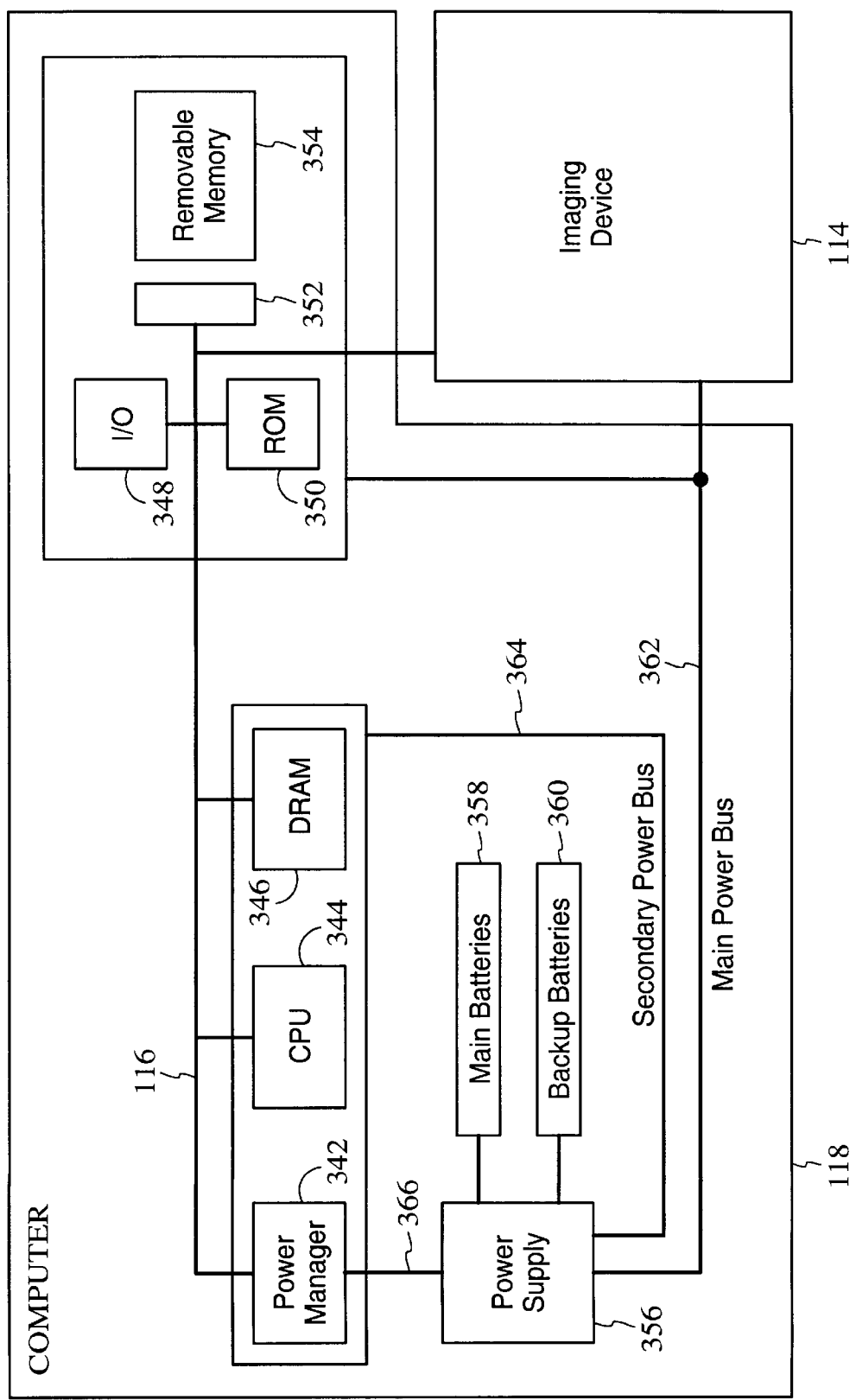
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 4:
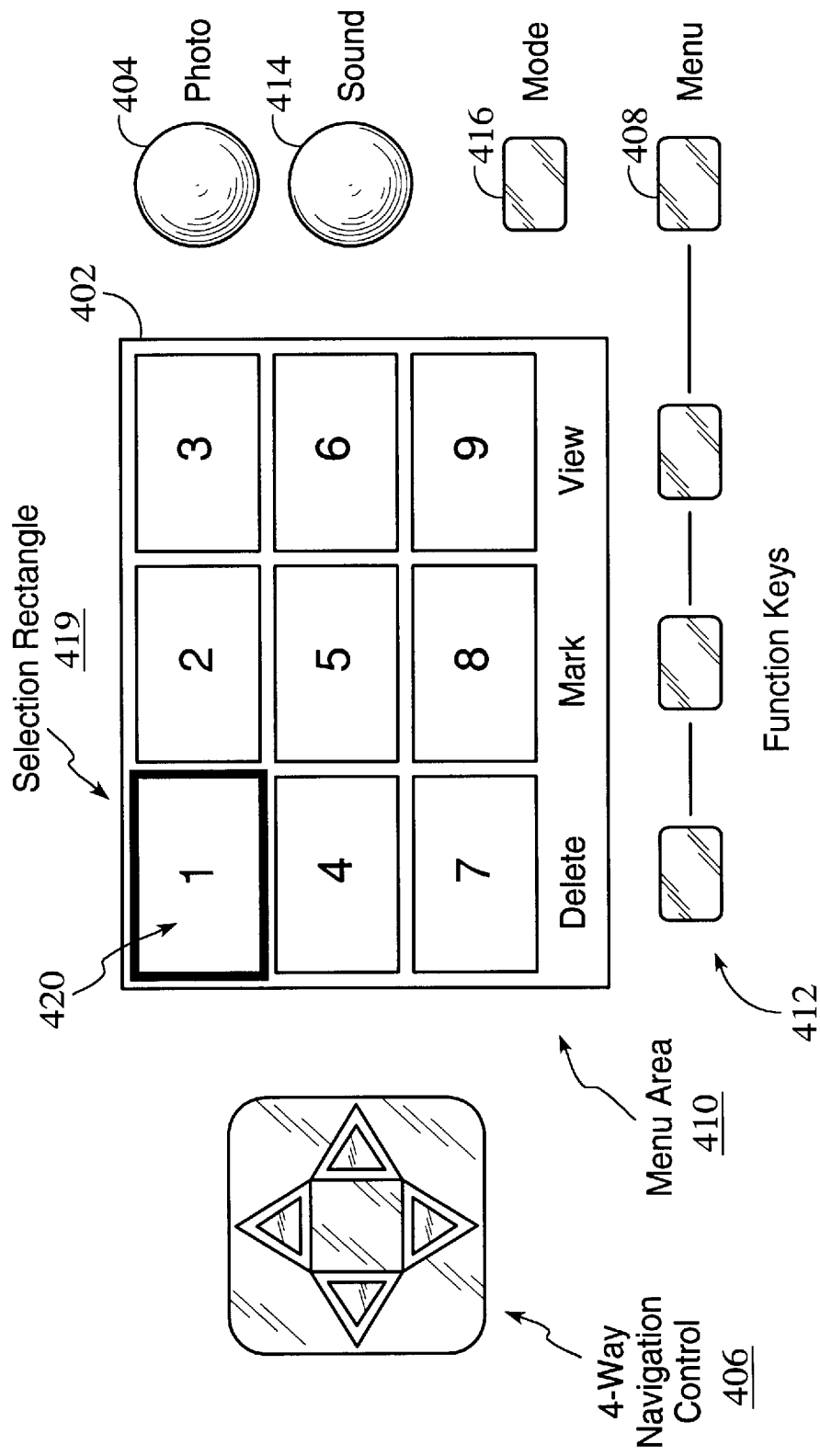
FIG. 4 is a block diagram depicting a user interface for the digital camera.

FIG. 4 is a block diagram depicting a user interface 400 for the digital camera. In one preferred embodiment, the user interface includes a view finder 402, an image capture button called a photo button 404, a four-way navigation control button 406, a menu button 408, a menu area 410 within the view finder 402, and function keys 412. The user interface 400 may also include an optional sound button 414, and a mode button 416.

Referring again to FIGS. 1 and 4, the user interface 400 operates in two modes: live view finder mode and review mode. In a preferred embodiment, the photo button 404 is a two position button. The live view finder mode begins when a user aims the camera at an object 112 and presses the photo button 404 into the first position. Once this occurs, the view finder 402 displays the image of the object 112 as shown through the camera's imaging device 114. The user may then press the photo button 404 into the second position to capture the image shown in the view finder 402. Review mode begins by pressing any other button on the interface 400.

Referring again to FIG. 4, once the digital camera 110 is placed in the review mode, the view finder 402 displays a series of cells 420 that represent the digital images that have been captured in the digital camera. The view finder 402 is shown here as displaying nine image cells 420. Each cell 420 displays a small-sized image corresponding to one of the captured images. The user may navigate through the series of displayed cells 420 in the view finder 402 using the four-way navigation control button 406. As the user navigates through the cells 420, the old image cells 420 are scrolled-off the view finder 402 and replaced by new image cells 420 representing other images stored in the camera.

The cell 420 currently selected by the four-way navigation control 406 is encircled with a highlighted area 419, which is shown as a selection rectangle. Other shapes for the highlighted area are also suitable. Once a cell 420 has been selected, the user may depress one of the function buttons 412 to in order to display a full-sized version of the image in the view finder 402.

As stated above, the method by which conventional digital cameras assign names to captured images creates naming conflicts when images are transferred to a host computer or a removable memory from the digital camera, and when images are transferred to the digital camera from a host computer. In both cases, stored images having the same names as the newly transferred images may be overwritten by the transferred images, and therefore lost.

Co-pending U.S. patent application Ser. No. 08/761,854, entitled "A System And Method For Naming Images In A Digital Camera Device," assigned to the Assignee of the present application and herein incorporated by reference, minimizes naming conflicts in a single digital camera by incorporating the total number of images captured by the digital camera in the image name. This method, however, will not avoid conflicts that arise when images from different digital cameras are stored on the same removable memory 354.

The present invention provides a method and system for managing a removable memory 354 such that the removable memory 354 may be used with more than one digital camera, while avoiding image name conflicts. According to the present invention, when a removable memory 354 is inserted into the digital camera, a camera folder or directory is created on the removable memory 354 corresponding to that digital camera. The images captured by that particular digital camera are then stored only in that folder in the removable memory. When the removable memory is transferred to another digital camera, the process is repeated. Since the images captured by a digital camera are stored in the digital camera's respective folder, image name conflicts on the removable memory are significantly reduced, if not eliminated.

Although many methods are available to create unique folder names for each digital camera, in a preferred embodiment of the present invention, unique folder names are created by incorporating the serial number assigned to each camera into the folder name. Preferably, the serial number is placed both on the outside of the digital camera as well as stored in a non-volatile memory, such as an EEPROM, in the digital camera, where it can be accessed to create the folder name after the removable media is inserted into the camera.

Figure 5:
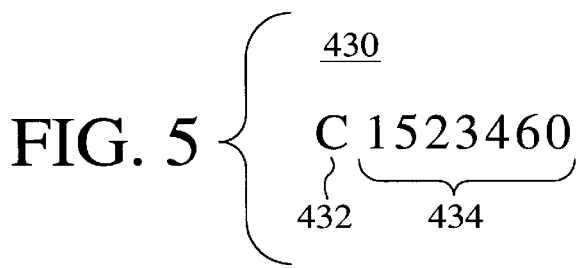
FIG. 5 is a diagram illustrating one preferred method for creating a folder name from the serial number of a digital camera.

FIG. 5 is a diagram illustrating one preferred method for creating a folder name from the serial number of a digital camera. According to the present invention, each folder name 430 is eight characters in length, and includes a prefix 432, and a serial number field 434. The prefix 432 occupies the first character of the folder name 430 and is used to identify what type of device the folder corresponds to, such as the digital camera, a scanner, or a laptop computer. If created for the digital camera, then the letter "C" may be displayed in the prefix 432, for example.

Following the prefix 432 in the folder name 430 is the serial number field 434, which displays the serial number assigned to the digital camera. The serial number field 434 is preferably a seven digit field, although other lengths are also suitable. If the actual serial number of the digital camera is less than seven digits in length, then the serial number 434 is padded with the appropriate number of zeros.

Referring again to FIG. 3, the CPU 344 executes an operating system, such as DOS, that is capable of creating directory structures in both the DRAM 346 and the removable memory 354.

Figure 6:
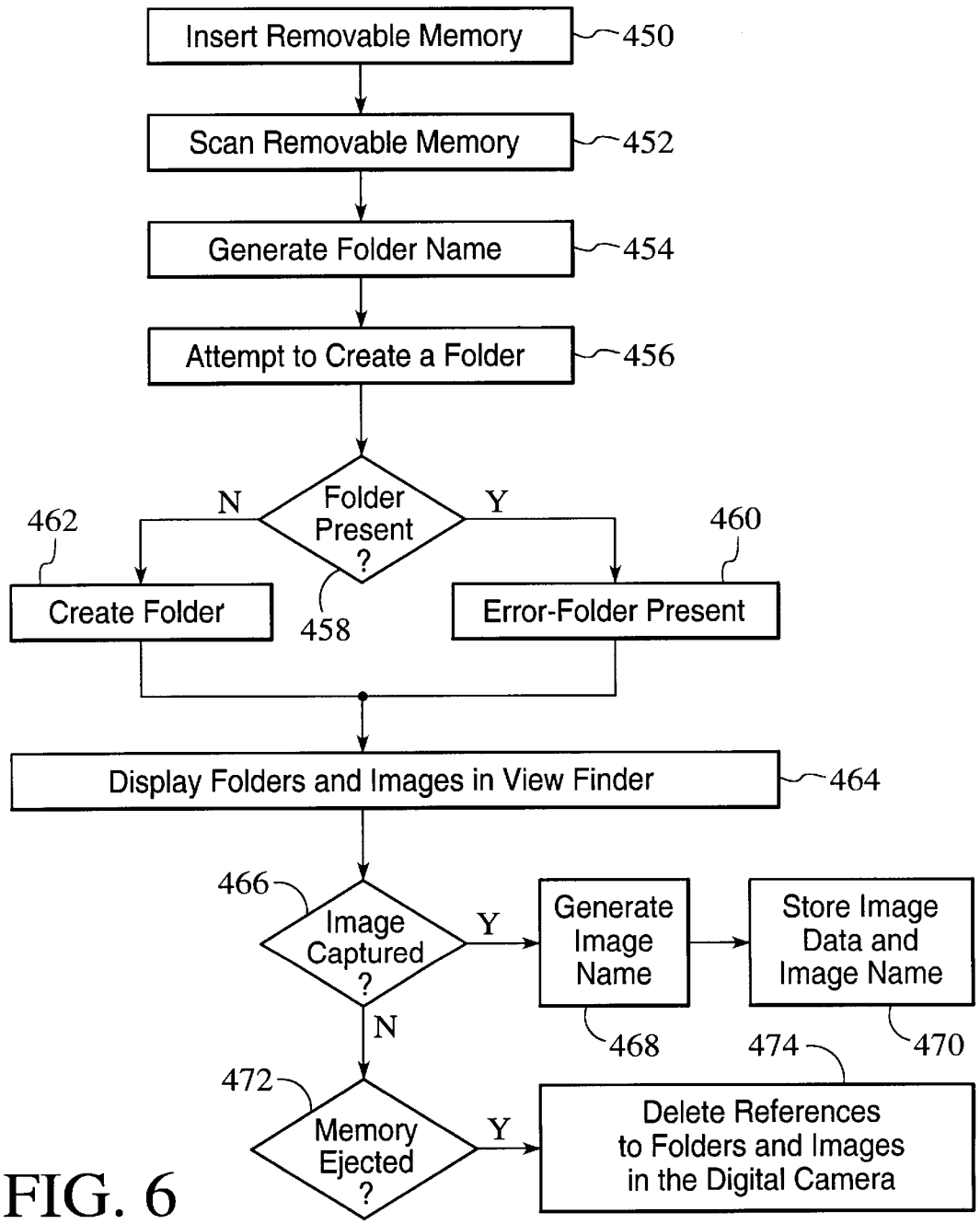
FIG. 6 is a flow chart of the process of managing the removable media in accordance with the present invention.

FIG. 6 is a flow chart of the steps involved in managing the removable media such that the removable media may be used with more than one digital camera without image name conflicts. The process begins in step 450 when the removable memory 354 is inserted into the digital camera in step 450, which generates an interrupt to the operating system.

In response to the interrupt, the operating system scans the removable memory 354 and inventories any folders and images found on the removable memory 354 in step 452. The operating system then generates the folder name from the serial number stored in the non-volatile memory in step 454. After creating the folder name, the operating system attempts to create a folder on the removable memory 354 for the digital camera in step 456.

If a folder has already been created on the removable memory 354 for the digital camera in step 458, then the attempt to create the folder generates an error condition in step 460. If a folder for the digital camera is not found on the removable memory 354 in step 458, then the operating system creates the folder directory on the removable memory 354 in step 462.

Referring now to both FIGS. 4 and 6, any folders and images found in the removable memory 354 are then displayed in the view finder 402 of the camera interface 400 in step 464. In response to the user capturing an image in step 466, the operating system creates an image file name for the image in step 468. If the images are named according to the invention of copending application Ser. No. 08/761,854 entitled "A Method And System For Naming Images In A Digital Camera," then each image is assigned a name that is unique for the digital camera. After the image name is created, the image data and the image name are then stored in the folder in the removable memory 354 that corresponds to the digital camera in step 470.

In response to the user ejecting the removable memory 354 in step 472, any reference to the folders and images on the removable memory 354 are deleted from the digital camera in step 474. This causes any such folders and images to be removed from the view finder 402.

Figure 7A:
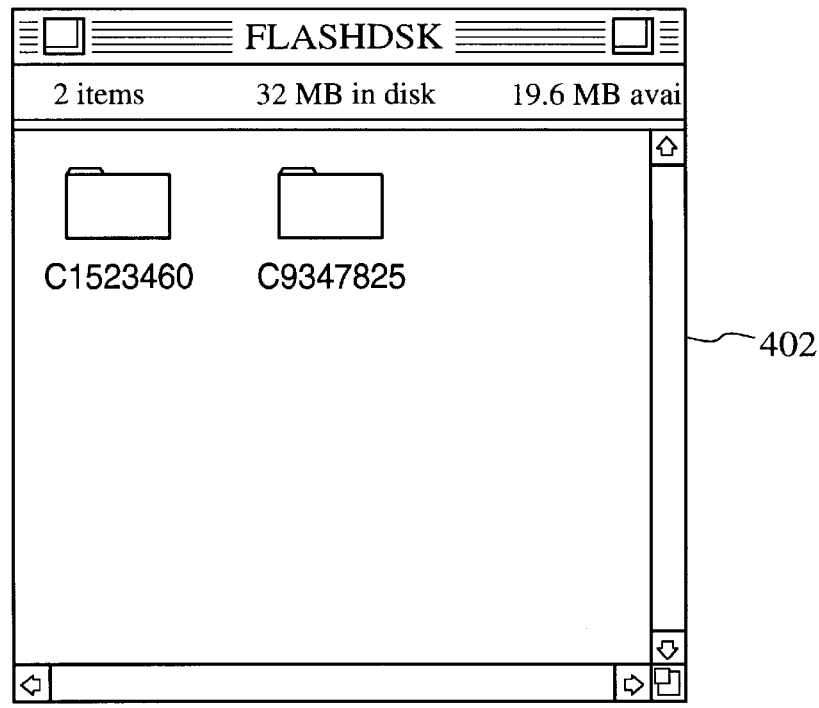
FIGS. 7A–7C are diagrams showing examples of the view finder of the digital camera when folders and images are displayed therein from the removable memory.
Figure 7B:
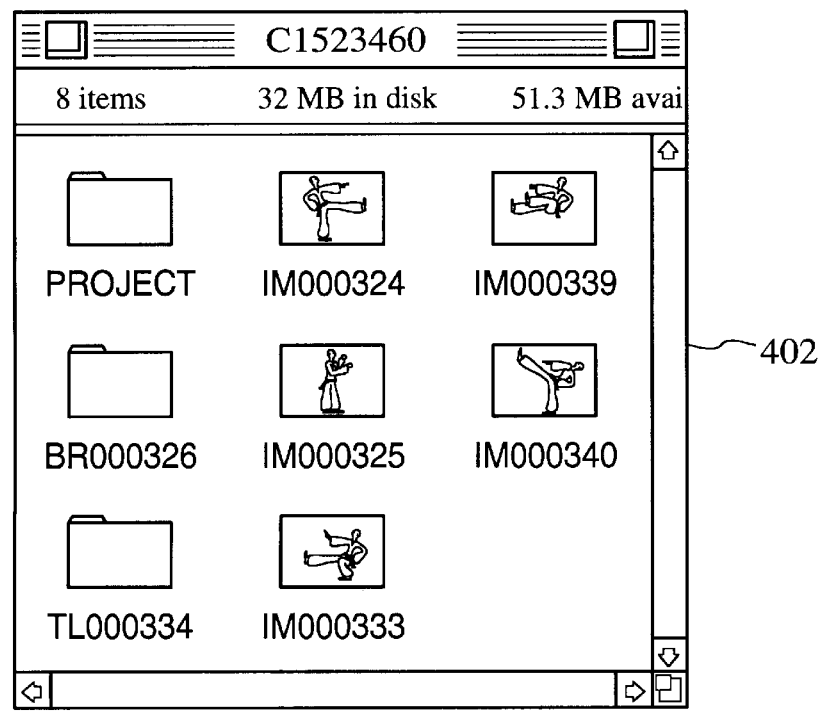
Figure 7C:
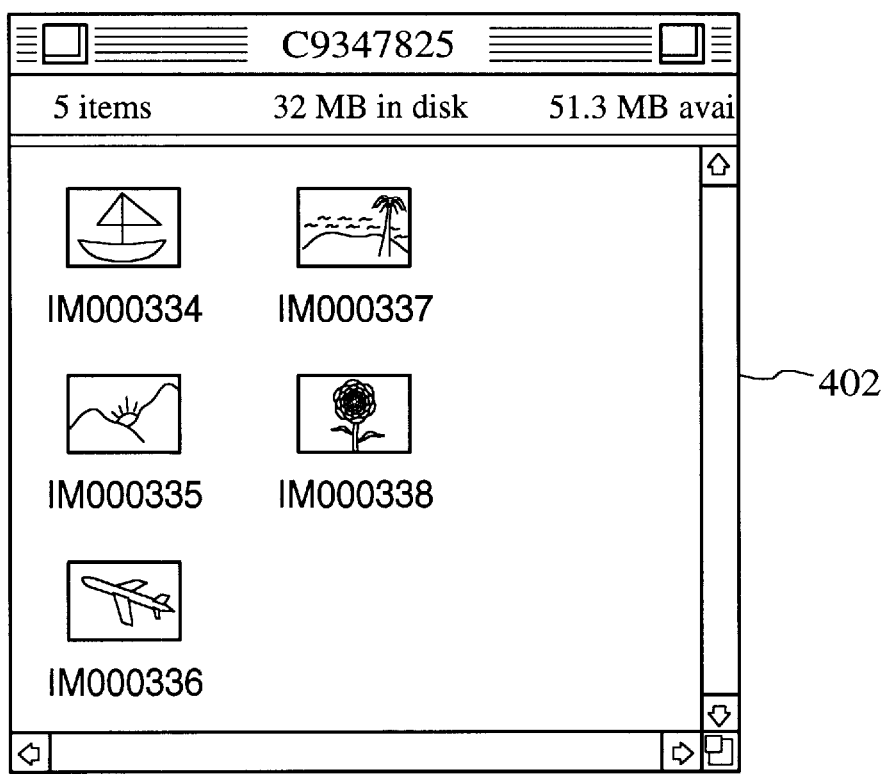

FIGS. 7A–7C are diagrams showing examples of the view finder 402 after the display step 464 has been performed. It should be understood that the purpose of FIGS. 7A–7C is to illustrate examples of a folder hierarchy, rather than to illustrate how folders are to be actually displayed in the view finder 402. In the example shown in FIG. 7A, the operating system has found two folders on the removable memory 354, which are displayed in the view finder 402 along with their unique folder names.

When the user selects one of the two folders, the images stored in the chosen folder are the displayed in the view finder 402. FIG. 7B shows the images stored in the folder named C1523460, while FIG. 7C shows the images stored in the folder named C9347825. The example folder in FIG. 7B is shown including both user created sub-folders and images. As illustrated in FIGS. 7A–7C, since the removable memory 354 stores images taken by different digital cameras in respective folders, image name conflicts are thereby avoided even when images taken by different cameras have the same names.

Not only does the present invention avoid image name conflicts, the present invention also automatically categorizes images according to the capturing digital camera. For example, images taken by two cameras having different camera settings can be stored on the removable memory 354 and then displayed in the view finder 402 for comparison. Since the folder names on the removable memory 354 indicate the originating camera, the user does not have to remember which images were taken with which camera.

A method and system for managing a removable memory in a digital camera has been disclosed that avoids naming conflicts. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for managing a removable memory used in a digital camera, comprising the steps of:
   (a) in response to the removable memory being inserted into a first digital camera, automatically creating a camera folder on the removable memory that uniquely identifies the first digital camera;
   (b) storing images captured by the first digital camera in the camera folder;
   (c) in response to the removable memory being transferred from the first digital camera to a second digital camera, automatically creating a second camera folder on the removable memory that uniquely identifies the second digital camera; and
   (e) storing images captured by the second digital camera in the second camera folder, such that image name conflicts between the first and second digital cameras are avoided.

2. A method as in claim 1 wherein the digital camera includes an assigned serial number, step (a) further including the steps of:
   (a1) generating a folder name using the serial number; and
   (a2) assigning the folder name to the camera folder.

3. A method as in claim 2 wherein step (a1) further includes the steps of:
   (a1)(i) providing the folder name with a serial number field; and
   (a1)(ii) using the serial number field to represent the serial number assigned to the digital camera.

4. A method as in claim 3 wherein step (a1) further including the steps of:
   (a1)(iii) providing the folder name with a prefix to identify what type of device the folder corresponds to.

5. A digital camera comprising:
   a non-volatile memory for storing a serial number assigned to the digital camera;
   a memory device removably inserted in the digital camera for storing sets of image data, each of the sets of image data corresponding to a captured image; and
   a processor coupled to the non-volatile memory and to the memory device for controlling operation of the digital camera, the processor functioning to automatically generate a first folder on the memory device when the memory device is first inserted into the digital camera, and for generating a unique folder name for the first folder using the serial number, wherein images captured by the digital camera are stored in the memory device only in the first folder; and
   in response to the removable memory being transferred from the first digital camera to a second digital camera, automatically creating a second camera folder on the removable memory that uniquely identifies the second digital camera.

6. A digital camera as in claim 5 wherein the folder name includes a serial number field for displaying the serial number.

7. A digital camera as in claim 6 wherein the folder name includes a prefix that identifies what type of device the first folder corresponds to.

8. A digital camera as in claim 7 wherein the digital camera further includes a user interface, the processor further functioning to scan to the memory device and to display in the user interface any folders and image data found in the memory device.

9. A digital camera as in claim 8 wherein the processor removes references to the folders and image data found in the digital camera when the memory device is removed from the digital camera.

10. A method for managing a removable memory in a digital such that the removable memory may be used with more than one digital camera without image name conflicts, the method comprising the step of:
    (a) inserting the removable memory into the digital camera;
    (b) scanning the removable memory and inventorying any folders and images found on the removable memory;
    (c) generating a unique folder name that uniquely identifies the digital camera;
    (d) attempting to create a first folder having the unique folder name on the removable memory for the digital camera;
    (e) generating an error condition in response to the first folder being found on the removable memory;
    (f) creating the first folder on the removable memory in response to the first folder not being found on the removable memory; and
    (g) in response to a user capturing an image, storing the image on the removable memory only in the first folder; and
    (h) in response to the removable memory being transferred from the first digital camera to a second digital camera, automatically creating a second camera folder on the removable memory that uniquely identifies the second digital camera.

11. A method as in claim 10 wherein step (c) further includes the step of:
    (c1) generating the folder name using a serial number assigned to the digital camera.

12. A method as in claim 11 wherein step (b) further includes the step of:
    (b1) displaying any folders and images found in the removable memory in a view finder on the digital camera.

13. A method as in claim 12 wherein step (b) further includes the step of:
    (b2) in response to the user ejecting the removable memory, deleting any reference, to the folders and images found on the removable memory.

* * * * *

UNITED STATES PATENT AND TRADEMARK OFFICE
CERTIFICATE OF CORRECTION

PATENT NO.    : 5,861,918  
DATED         : January 19, 1999  
INVENTOR(S)   : Anderson et al.

Page 1 of 1

It is certified that error appears in the above-identified patent and that said Letters Patent is hereby corrected as shown below:

<u>Column 8,</u>  
Line 24, after "digital", add -- camera --.

Signed and Sealed this

Eighteenth Day of December, 2001

Attest:

Attesting Officer

JAMES E. ROGAN  
Director of the United States Patent and Trademark Office